Nov. 8, 1955     C. J. EDWARDS, JR     2,722,843
DRIVE CHAIN

Filed Jan. 25, 1950     2 Sheets-Sheet 1

INVENTOR.
CYRIL J. EDWARDS JR.
BY Gregory S. Dolgorukov
ATTORNEY

Nov. 8, 1955   C. J. EDWARDS, JR   2,722,843
DRIVE CHAIN
Filed Jan. 25, 1950   2 Sheets-Sheet 2

INVENTOR.
CYRIL J. EDWARDS, JR.
BY Gregory S. Dolgorukov
ATTORNEY

United States Patent Office 2,722,843
Patented Nov. 8, 1955

2,722,843

DRIVE CHAIN

Cyril J. Edwards, Jr., Detroit, Mich.

Application January 25, 1950, Serial No. 140,498

5 Claims. (Cl. 74—250)

This invention relates to power transmission and more particularly to an improved wheel-and-chain drive for transmission of power between a plurality of shafts disposed at larger distances than those permitting economical use of gear trains, such for instance as in bicycles.

It has been well appreciated in the art that in instances where it is required to connect shafts which are too far apart for gearing, and not far enough for belt, and in places where positive connection is desired, particularly where the drive has to operate in mud or dust, use of the wheel-and-chain drives offers distinct advantages. Instances of such applications are in motors driving heavy machine tools; in trucks; agricultural machinery; bicycles; and numerous other types of applications. Accordingly, many designs of wheel-and-chain drives have been developed, mostly of the so-called sprocket wheel and chain type, in which the driving and the driven wheels are provided with projections or teeth on their rims, so arranged as to engage the links of a chain having engageable elements in the form of rollers or teeth. One of the most serious disadvantages of such constructions was found to be in the cost of machining of the sprocket wheel projections which for the proper operation of the chain must be of certain definite profile, as well as machining parts of the chain itself, particularly chains of the tooth type. Another disadvantage of prior constructions was found to be in the excessive weight thereof, due in part to the large number of rollers on chains of the roller type.

One of the objects of the present invention is to provide wheel-and-chain drive whereby the above mentioned and other disadvantages of prior constructions are overcome and largely eliminated, and light, strong and inexpensive construction is provided.

Another object of the invention is to provide an improved wheel-and-chain drive in which the engageable elements of the wheel are in the form of rollers or pins, while the engageable elements of the chain are of the tooth type.

A further object of the invention is to provide an improved wheel-and-chain drive in which both the wheel and the chain are made of sheet material by stamping operations, thereby ensuring lightness and low cost of manufacturing.

A still further object of the invention is to provide an improved wheel-and-chain drive which while being made by stamping from relatively thin sheet metal is nevertheless strong, rigid, and has ample bearing areas at places where bearing loads are exerted, thus preventing occurrence of excessive localized bearing strains.

A still further object of the present invention is to provide an improved wheel-and-chain drive, in which the chain is made by stamping from sheet metal and yet has very little elongation or stretch, thereby maintaining constant or nearly constant pitch in the chain and ensuring proper load distribution on the rollers of the wheel.

It is an added object of the present invention to provide an improved wheel-and-chain drive which is simple and rugged in construction, safe and dependable in operation, and is relatively inexpensive to manufacture.

Further objects and advantages of the invention will be apparent from the following description, taken in connection with the appended drawings, in which.

Figure 1:
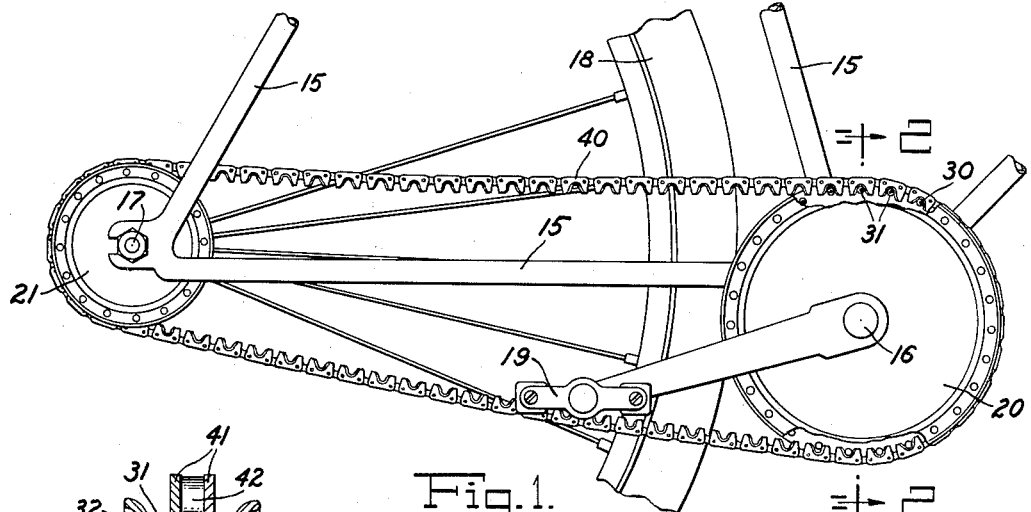
Fig. 1 shows the rear portion of a bicycle including a wheel-and-chain drive embodying the present invention.
Figure 2:
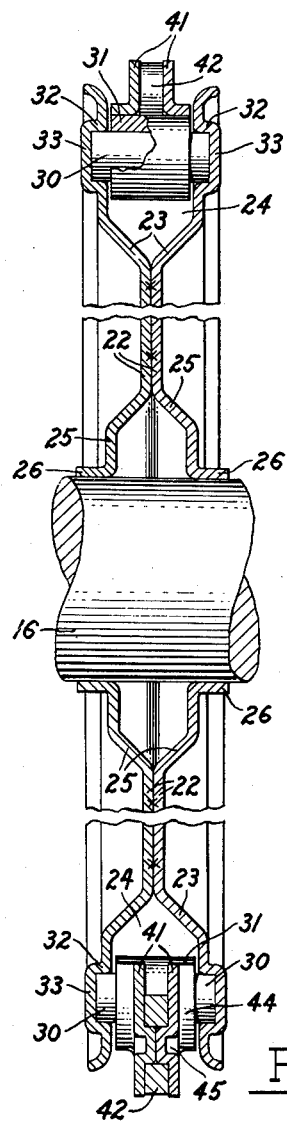
Fig. 2 is a fargmentary sectional view taken in the direction of the arrows on the section plane passing through the line 2—2 of Fig. 1.

It is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

In the drawings there is shown by way of example a wheel-and-chain drive embodying the present invention. The present invention is herein illustrated and described in application to a bicycle, which application is one of the most common and well known applications of such drives. It will be understood, however, that the present invention is not limited to such an application since it may be used with success in any practical instance where transmission of torque from one shaft to another with maintaining of a positive driving ratio is required.

In accordance with the invention one or both of the wheels are made by stamping, preferably in the form of two riveted or otherwise connected discs flared out at their peripheral edges to form a peripheral groove within which a plurality of rollers or pins is equidistantly arranged. The driving chain is made by stamping from relatively thin sheet metal, preferably sheet steel, and it consists of any desired number of chain units, said number being determined by the respective diameters of the wheels, distance between their axes, and the pitch or distance between the axes of two adjacent rollers. Each of the chain units includes at least one tooth link adapted to engage the wheel rollers, and a connecting link hingedly mounted on the tooth link for connecting it to the tooth link of the adjacent chain unit. In accordance with the invention, the stamped sheet metal chain is so constructed that elements or portions of it operating in tension are arranged parallel to the direction of the tension producing forces, while for carrying bearing loads (which loads thin sheet metal so disposed would be either totally uncapable of bearing, or which would cause excessive concentrations of bearing loads and wear) the sheet metal is formed to provide increased bearing areas for distribution of such bearing loads. By virtue of such a construction strong, light and inexpensive wheel-and-chain drive is provided which is suitable for applications where many types of conventional drives of this nature have heretofore been considered impractical.

Referring to Figs. 1–4, the same illustrate a bicycle having provided therein a wheel-and-chain drive embodying the present invention. With the exception of the wheel-and-chain drive, the bicycle is of a conventional nature, and therefore no detailed showing or description thereof is necessary here. The bicycle includes a frame 15 on which there is rotatably mounted in a manner well known in the art a driving shaft 16 and a driven shaft 17, the latter being drivingly connected to the bicycle rear wheel 18. Driving effort exerted on pedals 19 by the operator's feet is causing rotation of the driving shaft 16. The torque or rotating effort is transmitted from the shaft 16 to the shaft 17 with the aid of my improved wheel-and-chain drive.

The wheel-and-chain drive comprises a driving wheel 20 and a driven wheel 21 which wheels, except for their respective diameters, may be of a similar construction. The terms "driving wheel" and "driven wheel" are used herein for the purposes of description but should not be taken or interpreted as limiting the invention, since in most of applications the direction of transmission of power may be selectively reversed, thereby making the driving wheel operate as a driven wheel and vice versa. Referring for the purposes of description to the driving wheel 20 and its illustration in Figs. 1 and 2, the wheel is made up of two substantially identical stamped sheet metal discs 22 secured or otherwise connected together in any suitable manner, such as by spot welding. The peripheral edges of the discs 22 are flared out or formed as shown at 23 to provide when the discs are secured together a peripheral groove 24 around the wheel. The central portions of the discs 22 are also pressed outwardly as shown at 25 to form a hub portion of the wheel, and to provide flanges 26 by which the wheel may be drivingly connected to the shaft in any suitable manner, such as with the aid of screws (not shown). Such a construction, in addition to providing for mounting of the rollers as hereinafter disclosed, also ensures light but very strong and rigid construction of the wheel and its ability to transmit high torque and resist side thrust forces. If desired, the hub portion of the wheel may be made separable in order to permit mounting the same wheel on shafts of different diameters by the use of different hub portions, or to facilitate removal of the wheel from a shaft.

Figure 11:
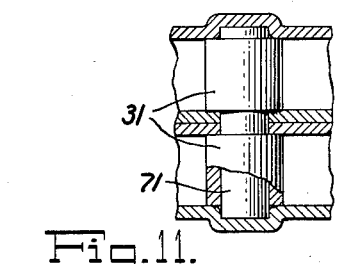
Fig. 11 is a fragmentary top view illustrating an example of coupling two wheels together for engagement by a chain such as illustrated in Fig. 10.

Within the groove 24 there is operatively arranged a desired number of rollers equidistantly arranged therein at a certain selected distance (pitch). In the present embodiment of the invention mounting of the rollers is attained by connecting pins 30 to the peripheral flanges of the discs and rotatably mounting thereon rollers 31. The pins 30 may be permanently secured to said flanges such as by riveting or upsetting their ends or by welding, or they may be removably mounted. In the embodiment shown in Fig. 2, the pins 30 are rotatably mounted and received in stamped out depressions having walls 32 providing increased bearing areas for the ends of the pins 30, and closed bottoms 33 retaining the pins longitudinally. The length and the diameter of the rollers is selected upon consideration of the maximum force to be transmitted by the chain, as well as of the desired unit bearing load on the rollers and chain surfaces engaging the same. It is a safe practice to presume in making computations that the entire force transmitted by the chain may be exerted thereby on a single roller. Should the forces to be carried by the rollers require rollers of excessive length, any practical plurality of wheels mounted side by side and connected together may be used, such as illustrated in Fig. 11.

The wheels 20 and 21 are connected for transmission of power or torque, with the aid of a driving chain generally designated by the numeral 40. The chain consists of any desired number of substantially identical units, having the same pitch as the wheels. It is an important feature of the present invention that the chain is made from relatively thin sheet material by stamping operations with no or very little machining. For applications such as in bicycles, sheet steel of approximately .035" in thickness gives very good results.

Figure 3:
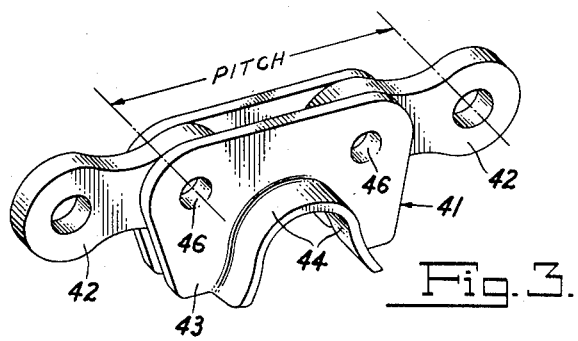
Fig. 3 is a perspective view of a portion of the driving chain.
Figure 4:
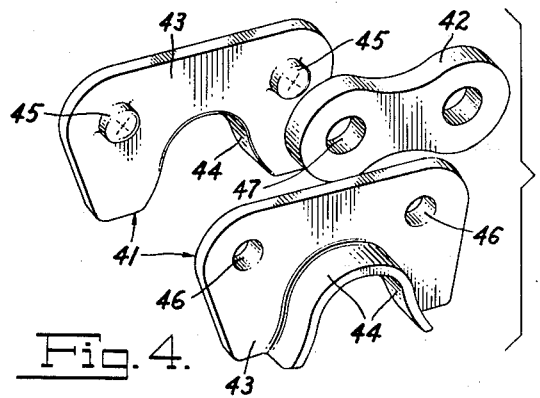
Fig. 4 is an exploded view of one chain unit of the construction of Fig. 3.

Figs. 3 and 4, show portions of a chain, with Fig. 4 showing all elements of one unit only. Referring to said figures, each of the units comprises two substantially identical tooth links 41 and a single connecting link 42 hingedly connected to said links by one of its ends, its other end being adapted to be similarly connected to the tooth links of the adjacent chain unit. Each of the tooth links comprises a tooth or longitudinal portion 43 and a bearing or transverse portion 44 formed integrally with said tooth or longitudinal portion and adapted to engage rollers 31. The contour of the bearing portions 44 is selected to ensure proper engagement of the rollers, considering rotation of the wheels and, consequently bodily movement of the rollers. As shown in Figs. 3, 4, 5, 6 and 7, the bearing portions of the tooth links are adapted to engage the pins or rollers of the wheel when in full engagement therewith by embracing such pins or rollers through substantially one-half of their respective peripheries, and are flared out further down to permit the pins or rollers to come out from the driving engagement with the bearing portions without interference. It will be understood, however, that depending upon the direction of driving only one side or the other of the roller-straddling portion of each link would go through the process of exerting driving pressure on the roller. The bearing portions 44 are made long enough to ensure that they engage as large a portion of the length of the rollers 31 as possible, and preferably the entire length thereof. In the embodiment illustrated in Figs. 3 and 4, it is only the middle portion of the roller in the amount of the thickness of the connecting link 42 that is not engaged by the bearing portions. Under certain conditions it may be desirable to eliminate even such small ineffective area of the roller by upsetting the edges of the portions 43 over the bearing portions 44 for a distance equal to half of the thickness of the connecting link 42, thereby ensuring that bearing portions 44 of both links come together and yet the link 42 has room to operate.

Means are provided to effect securing the links 41 together and forming at the same time the hinge connection between the tooth links and the connecting link. In the present embodiment said means are exemplified by bosses 45 stamped out on portions 43, the height of each boss being slightly larger than half of the thickness of the connecting link 42. The bosses 45 protrude inwardly of the chain and appear as depressions 46 on outer sides of portions 43. In assembling, the bosses 45 are passed through bearing holes 47 of the connecting link 42 to meet each other, and are spot welded together, thus forming in effect a built-up pin or hinge for the link 42. Any desired number of chain units may be thus assembled to provide a chain of desired length. When the chain is passed over the wheels, its ends may be similarly connected by spot welding, or the last connection may be effected by using a pin passed through holes drilled in portions 43 in places of bosses, and upsetting the ends of the pin.

Figure 5:
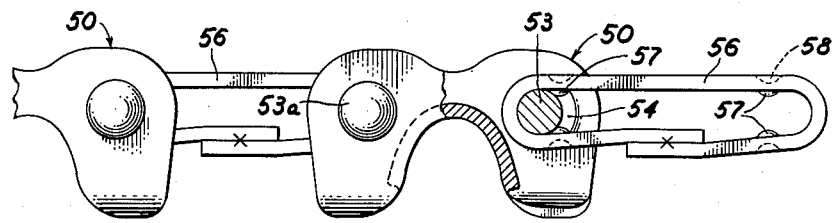
Fig. 5 is a side view partly in section showing a portion of the driving chain of modified construction.
Figures 6, 7:
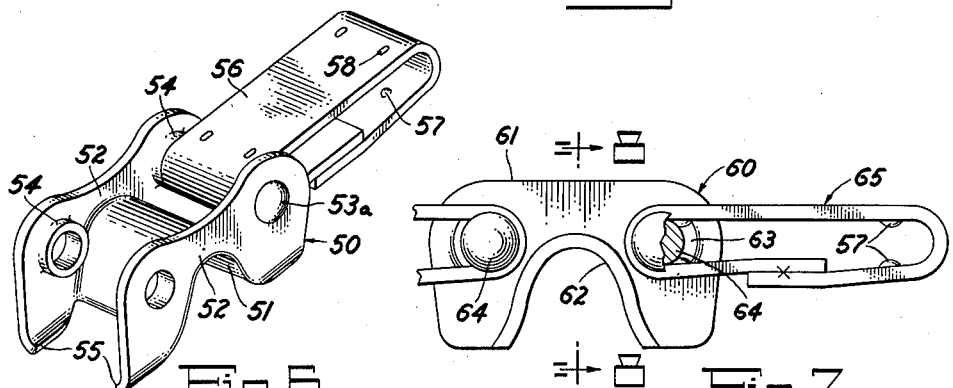
Fig. 6 is a perspective view showing one chain unit of the construction illustrated in Fig. 5.
Fig. 7 is a side view partly in section showing another modification of the driving chain.

Figs. 5 and 6 illustrate a modified construction of the chain. In this construction the tooth link 50 is of an integral construction and it comprises a bearing portion 51 having its ends turned upwardly to form two tooth portions 52. The tooth portions 52 have holes provided therein for the reception of the pins 53. The edges of portions 52 at the edges of the holes are pressed to form inwardly directed tubular extensions 54 as is best shown in Fig. 6. This expedient operates to increase the bearing area in the portions 52 beyond the thickness of the sheet metal thereby preventing excessive unit bearing loads and excessive wear of the pin as well as of the walls of the pin-receiving holes. The lowermost edges of the portions 52 are bent inwardly as shown at 55 in order to facilitate entrance of the links into the wheel groove. The connecting link 56 is in the form of a strip of sheet metal bent to form an elongated O-shaped link adapted to receive the pins 53 at its ends. The ends of the strip may be butt welded together or made to overlap and spot welded, as shown. Pin retaining bosses or pips 57 are provided on the inner surfaces of the link adjacent the pin. Formation of the bosses by stamping causes depressions 58 on the opposite side of the material. In assembling the chain, the link 56 is placed between the sections 52 and aligned with the pin-receiving holes thereof. The pin 53, which may have slightly rounded ends, is passed through the pin-receiving hole of one of the portions 52, through the connecting link 56, and through the pin-receiving hole of the other portion 52. The length of the pin 53 is such that its ends protrude beyond the link 50 and when upset or riveted form heads 53a. The resulting expansion of the pin ends secures them from rotation in the holes. The other end of the link 56 is assembled in a similar manner to another tooth link, which tooth link, in turn, is assembled to another connecting link, and so on, for formation of the chain. In the assembled position, the connecting link 56 is, in effect, wrapped around the two pins of the adjacent chain sections.

Figure 8:
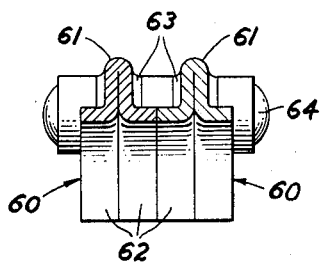
Fig. 8 is a sectional view taken in the direction of the arrows on the section plane passing through the line 8—8 of Fig. 7.
Figure 9:
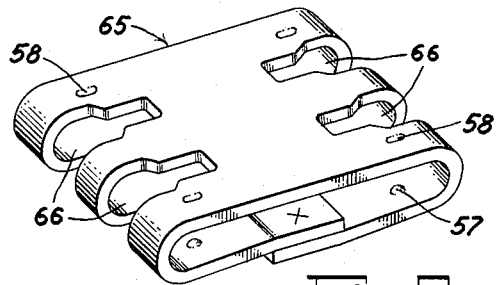
Fig. 9 is a perspective view showing one connecting link of the chain illustrated in Figs. 7 and 8.

Figs. 7, 8 and 9 illustrate a still further modification of the driving chain embodying the present invention. In this construction two tooth links 60 are used. Each of the tooth links 60 comprises a piece of sheet metal bent upon itself as shown at 61, with the metal of the two depending flanges thus produced being formed to provide the bearing portions 62. Pin-receiving holes are provided, and the metal around the edges of the holes is formed to provide tubular extensions 63 increasing the bearing area contacted by pin 64. The connecting link 65 is generally similar in construction to the connecting link 56 of the chain illustrated in Figs. 5 and 6 but is provided at each of its pin-receiving ends with two slots 66 for the passage of the bearing portions 63.

It should be understood that instead of folding the sheet metal upon itself as shown at 61 for formation of the tooth links 60, a single piece of sheet metal may be upset at one of its edges and the bearing portions similar to portions 62 formed also by upsetting or by similar operations. Therefore the term "stamped" as herein employed should be understood as including such upsetting operations as well.

It will now be seen in view of the foregoing that by virtue of the above construction exceedingly light but strong and rigid driving chain is provided. Its decrease in weight is due partly to the fact that the rollers which are the heaviest parts of the construction are provided not on the chain but on the wheels where their number is much smaller than the number of rollers that would be required on the chain. For an average installation the saving in the number and the weight of rollers only effected by the use of my construction may be as high as 70%. Moreover, by eliminating machined links and providing stamped sheet metal links with tubular extensions for the pins and flared out bearing portions, the metal employed is used much more efficiently by causing all portions thereof to carry as high a load as permissible, and eliminating, for instance, links which are made much thicker than is required to resist tensile stresses merely for the purpose of having walls thick enough to provide sufficient bearing areas.

In manufacturing, assembled chains of desired length are stressed by application of maximum or near maximum force which they are intended to carry. Such a procedure in addition to insuring the strength of the chain, also causes the chain to assume its predetermined length and uniform pitch and to prevent its such stretching after installation.

Figure 10:
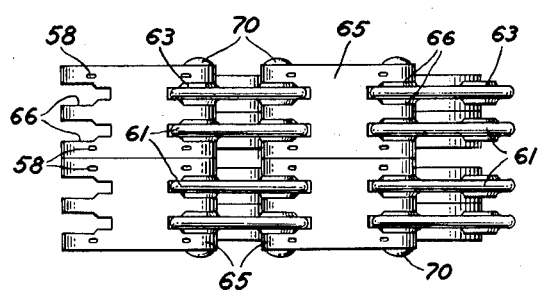
Fig. 10 illustrates an example of making-up driving chains of increased width for increased power transmitting capacity of the drive.

In cases where load transmitting requirements are much greater than the load transmitting capacity of a single chain, any practical number of my wheels and driving chains may be operatively connected such as illustrated in Figs. 10 and 11. While in using such a construction a number of wheels and chains may be mounted side by side and operate as a plurality of single units, under some conditions, particularly where space requirements are rigid, pins of increased length for the links such as pins 70, as well as similarly longer rollers pins 71 for the wheels may be employed. In such a case the sides of the wheel discs may be ground off to remove the closed ends of the roller pin-receiving depressions as well as the excess of flared out peripheral outer edges of the discs and hub flanges and ensuring that wheels can be assembled together into a more compact structure.

By virtue of the above construction the objects of the present invention listed above and numerous additional advantages are attained.

I claim:

1. A chain for a wheel-and-chain drive, said chain consisting of a plurality of units, each of said units comprising a sheet metal tooth link having two tooth portions and a bearing portion integrally formed with said tooth portions and adapted to engage a wheel for driving, two pins operatively arranged in said tooth portions for transmitting the load, and a sheet metal connecting link in the form of a wrapped metal strip connecting one of said pins with a pin on the tooth portion of the adjacent chain unit.

2. A chain for a wheel-and-chain drive, said chain consisting of a plurality of units, each of said units comprising a stamped tooth link having two spaced tooth portions and a bearing portion integrally formed with said tooth portions, two pins operatively arranged in said tooth portions for transmitting the load, and a sheet metal connecting link disposed between said tooth portions, said link being in the form of a metal strip wrapped around one of said pins and a pin on the tooth portion of the adjacent chain unit.

3. A chain for a wheel-and-chain drive defined in the claim 2, said connecting link being stamped to form pin retaining bosses.

4. A chain for a wheel-and-chain drive, said chain consisting of a plurality of units, each of said units comprising a tooth link having two tooth portions each of said portions comprising a piece of sheet metal folded upon itself with the metal adjacent to its edges opposite to the fold flared outwardly to form a bearing portion, two pins operatively arranged on said tooth portions and connecting the same to have their bearing portions form continuations of each other, and a stamped sheet metal connecting link, said connecting link comprising a strip of sheet metal wrapped around one of said pins and the pin on the adjacent chain unit.

5. The construction defined in the claim 4, said connecting link having slots for the passage of the tooth portions, and stamped out bosses on its inner surfaces adjacent the pins for retaining the same.

References Cited in the file of this patent

UNITED STATES PATENTS

| Number | Name | Date |
|---|---|---|
| 468,843 | St. John | Feb. 16, 1892 |
| 499,627 | Brown | June 13, 1893 |
| 579,742 | Cottie et al. | Mar. 30, 1897 |
| 581,812 | Davies | May 4, 1897 |
| 617,797 | Wunderlich | Jan. 17, 1899 |
| 618,642 | Clouser | Jan. 31, 1899 |
| 995,137 | Hayward | June 13, 1911 |
| 1,379,507 | Alexander | May 24, 1921 |
| 2,229,106 | Lomando | Jan. 21, 1941 |
| 2,551,578 | Bendall | May 8, 1951 |

FOREIGN PATENTS

| Number | Country | Date |
|---|---|---|
| 13,855 | Great Britain | of 1898 |